United States Patent
Duckeck et al.

(10) Patent No.: US 6,678,609 B1
(45) Date of Patent: Jan. 13, 2004

(54) NAVIGATION WITH MULTIMEDIA

(75) Inventors: Ralf Duckeck, Hildesheim (DE);
Otmar Pilsak, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,848

(22) PCT Filed: Nov. 11, 1999

(86) PCT No.: PCT/EP99/08656

§ 371 (c)(1),
(2), (4) Date: Sep. 28, 2001

(87) PCT Pub. No.: WO00/29811

PCT Pub. Date: May 25, 2000

(30) Foreign Application Priority Data

Nov. 16, 1998 (DE) .......................... 198 52 659

(51) Int. Cl.$^7$ .............................. G01C 21/32
(52) U.S. Cl. ............ 701/200; 701/211; 340/995.1
(58) Field of Search ............... 701/25, 200, 207, 701/208, 211, 210; 340/988, 990, 991, 995.1, 995.24; 342/357.01, 357.08, 357.09, 357.13; 73/178 R

(56) References Cited

U.S. PATENT DOCUMENTS

| | | |
|---|---|---|
| 5,610,822 A | 3/1997 | Murphy |
| 5,717,392 A | 2/1998 | Eldridge |
| 6,128,650 A * | 10/2000 | De Vos et al. ............... 709/217 |
| 6,182,000 B1 * | 1/2001 | Ohta et al. ..................... 701/55 |
| 6,498,985 B1 * | 12/2002 | Petzold ........................ 701/211 |

FOREIGN PATENT DOCUMENTS

| | | |
|---|---|---|
| DE | 30 05 602 A1 | 10/1981 |
| DE | 44 37 360 | 4/1996 |
| DE | 195 16 476 A1 | 11/1996 |
| DE | 196 40 735 | 4/1998 |
| EP | 0 323 245 | 7/1989 |
| EP | 0 785 535 | 7/1997 |
| WO | WO 97/07467 | 2/1997 |

OTHER PUBLICATIONS

Operating Instructions Merian scout, Editorial Office Merian scout, Gräfe und Unzer Verlag GmbH, Munich*, month/year not available.

* cited by examiner

Primary Examiner—Tan Q. Nguyen
(74) Attorney, Agent, or Firm—Kenyon & Kenyon

(57) ABSTRACT

An information carrier is described which makes available multimedia sets of data concerning objects along a travel route or at the travel destination for use in a navigational device. In this connection, the representation can also take place automatically in dependence on the position of the vehicle, and can be supplemented by data retrievable via radio communication from a service control point.

26 Claims, 1 Drawing Sheet

NAVIGATION WITH MULTIMEDIA

FIELD OF THE INVENTION

The present invention relates to an information carrier.

BACKGROUND INFORMATION

A conventional information carrier stores data concerning hotels, restaurants, tourist attractions, etc, in text form. Such data can be retrieved by the user and optically displayed (Operating Instructions MERIAN scout, Editorial Office MERIAN scout, Gräfe und Unzer Verlag GmbH, Munich). Data in other than pure text form are not made available.

SUMMARY

In accordance with an example embodiment of the present invention, an information carrier is provided that has the advantage that, particularly in addition to the text data, further data in multimedia form are stored on the information carrier, that is, in the form of images, image sequences, films, sound and music documents or in mixtures of these forms. Thereby, the user can inform himself far more broadly about special objects along the travel route or at the travel destination without using additional material such as a travel guide. Special objects having touristic meaning may be included such as hotels, restaurants, theaters, museums, churches, natural monuments, special buildings, such as palaces and castles, parks, spas and lakes.

It is also of advantage that the data on the special objects are output according to criteria defined by the user. Thus, the user can pause and inform himself on objects down the road. The targeted search is made possible by the fact that at least one generic term has been assigned to the data on the special objects. Generic term here includes, for example, a category such as "hotel" or "museum", which can be made more specific by subdivisions such as "hotel", "2-star" or "museum", "modern art". In case of a vehicle defect, for instance, it can be made possible for the user to inform himself about the position and appearance of the next repair garage.

It is also of advantage that the data can be output automatically, depending on vehicle position. Because this makes the search effort unnecessary, this relieves the user, so that he can inform himself especially during music and sound documents, even while traveling. Additional data do not have to be searched for, so that, on the one hand, objects are pointed out to the user which he did not know before. On the other hand, since the user can predefine limiting criteria, as for instance the maximum distance or a generic term, such as "hotel", he can limit the output to data important for him.

It is also of advantage that data on operating the motor vehicle and its components may be stored on the information carrier. In particular, these may be pointers in case of a vehicle defect which can be recalled automatically when the corresponding error occurs. For the output of these data, the acoustical and/or optical output of the navigational device, in which the information carrier is inserted, can be jointly used.

It is furthermore of advantage that the navigational device may call up the special objects according to predefinable criteria via radio data. Data are transmitted from the service control point to the navigational device via a downlink channel. These data can be updated by the service control point. Furthermore, no memory space is needed for permanent storage in the navigational device.

Beyond that, it is of advantage that the navigational device has available an uplink channel. In particular, it is possible, via the uplink channel, to request additional and/or updated data transmitted via the downlink channel. These data can especially become the basis for changing the selected travel route for a relevant reason. In this connection, addresses, especially Internet or www addresses may already be stored on the information carrier.

Furthermore, it is advantageous that a reservation can be made via the uplink channel and a confirmation of the reservation can be made via the downlink channel, because this makes it possible for the user, for instance, upon display of an object—for example of a restaurant or a theater—to reserve a table or admission tickets.

It is also advantageous that data retrievable by radio can be supplemented in multimedia form by data stored on an information carrier. This makes it possible to limit data transmission to current data—for example, occupancy of a hotel—whilst memory-intensive data—for instance, a photo of the hotel—are available in the information carrier.

Besides a device for playing an information carrier which contains, in particular, the purely navigational data, a second device for playing an information carrier can be connected to the navigational system on which only the additional information is stored. This offers the advantage of being able to cover a larger map area, using both information carriers, for which navigational and additional data have been made available.

It is further advantageous that the sound output takes place over the automobile radio, because in that manner, an additional sound output is saved in the navigational system.

The implementation of the uplink and downlink channels via a GSM connection, or the implementation of a downlink channel via a DAB connection, offer the advantage that a mobile phone, possibly available in the vehicle, which has available a GSM connection, can be used jointly. A joint use is likewise possible if a videophone is present, in case the uplink and/or the downlink channel is implemented by a videophone connection.

BRIEF DESCRIPTION OF THE DRAWING

The FIGURE shows a navigational device according to an example embodiment of the present invention having connected units and radio connection via an uplink and a downlink channel.

DETAILED DESCRIPTION

Figure 1:
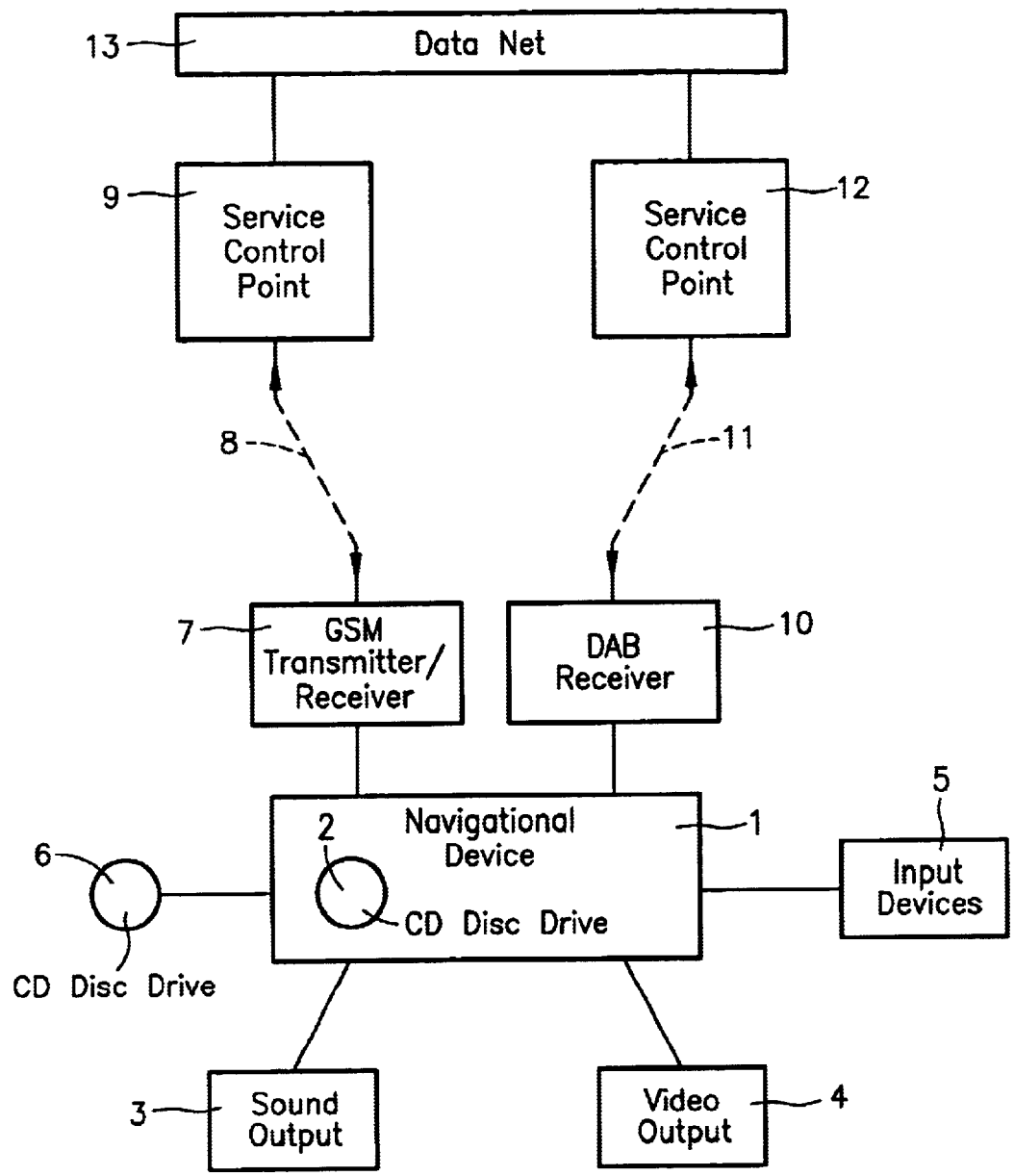

In the FIGURE, a navigational device 1 according to an example embodiment of the present invention is shown having a CD disc drive 2. Connections of the navigational device 1 to sensors and a GPS receiver used for position finding are not shown, nor are calculator and memory units present in the navigational device. The navigational device 1 is connected to a sound output 3, and the output can take place either directly or via a sound output. In the example embodiment, the sound output is implemented by an automobile radio. Video output 4 is connected to navigational device 1 either directly or via a video outlet. Furthermore, input devices 5 for the user are connected to navigational device 1. An additional CD disc drive 6 can optionally be connected to navigational device 1. A GSM transmitter and receiver 7 are also connected to navigational device 1. It is used to pass on data to a service control point 9 via uplink channel 8. It is further possible that uplink channel 8 functions, via GSM, also as downlink channel from the service control point to navigational system 1 via GSM receiver 7. A DAB receiver 10 is also connected to navigational system 1. The receiver is used for receiving data from a service control point 12 via a downlink channel 11. Service control points 9 and 12 may be connected directly to each other, but they can be identical. The possibility also exists that service control points 9 and 12 are connected to a data net 13, e.g., the Internet. Not shown in the drawing is a connection of service control points 9 and 12 as well as of data net 13 to computers which belong to the special objects along the travel path, e.g., to a hotel.

The data are available in multimedia form, that is, in the form of images, image sequences, films, sound or music documents or in the form of mixtures of these forms. They are stored as data on the information carrier, and may be in the form of different databases. In this example, an image sequence may be a sequence of several images which the eye can clearly distinguish from one another, in contrast to a film.

Here the information carrier may be a CD-ROM, but, among other things, a DVD or a semiconductor device.

Data are stored on the special objects explained above, especially if they have touristic meaning. The data are linked to location information in each case. In dependence on the actual vehicle position, the navigational system can now issue data by comparing the actual vehicle position with the stored location data. The location information here represents a position on a digital map, and can be represented on it by a dot, a line, or rather a vector, or a plane, any of which can be accessed by the navigational device. The location information can refer to the real point of the object or to a position on a road that is to be assigned to the object. For example, a branching-off to a hotel or to a tourist attraction on the other side of a river could be marked by such a position. The map data, which may be, for example, in the form of a digital map, can, for instance, also be stored on the data carrier which is located in the CD disc drive. In this connection, the user can, for instance, specify whether all stored data on the environment of the vehicle, e.g., within a circumference of 1 km, are to be output or whether data on the desired road still to be traveled, e.g., the next 3 km, are to be displayed. The navigational system compares this area automatically with the actual vehicle position. Now, if, by the movement of the vehicle, objects on which data are available reach the area specified by the user, the navigational device outputs this information automatically. A further possible criterion for the selection is generic terms for objects. Different generic terms can be, for example, hotels, eating or drinking establishments, theaters, museums or churches. Such a generic term can be stored additionally for each object, along with the data, on the information carrier. Thus, the driver can, for instance, have an output made of data on all hotels or all museums. This criterion can be linked with the selection of a location area, for example all hotels within a circumference of 10 km. The input is made similarly via input device 5. Furthermore, via input device 5, data can be output on demand by the user, independently of the vehicle position. The output takes place via sound output 3 and/or via video output 4.

It is further possible to store supplemental data on vehicle operation in multimedia form on the information carrier. This can be done concerning operating instructions for the navigational system itself, additional vehicle components, such as the automobile radio, or even the entire vehicle. In particular, a help function is possible in case of the loss of system components, such as the ABS, the generator or the oil supply. In the case of failure, this is displayed automatically.

It is also possible to retrieve additional or updated data from supplemental CD disc drive 6 or from service control points 9 and 12 via uplink and downlink channels 8 and 11. Again, these centers can make available additional sets of information via data net 13. Using input device 5, the user can make a reservation for an object at the travel destination, e.g., a room reservation at a hotel, via the navigational system and uplink channel 8 as well as service control point 9.

Video output 4 can be made over different units. The navigational system 1 may be connected to the display of a freely programmable instrument cluster. At the request of the user, then, the data are indicated on the display. Furthermore, the video output can be fashioned as a screen, for example, in the middle of the vehicle, or as a head-up display, in which the image is projected onto the windshield.

Input device 5 can be made in different design forms, of which one or a plurality are available to the user. Input into navigational system 1 can be made on a keyboard, through a microphone connected to a voice data input interpreter or via a screen having a menu selection. It is further possible for input device 5 to have a microphone and a camera of a videophone, and that, using these, direct contact can be established with service control point 9 via navigational system 1 and uplink and downlink channel 8.

An example of the diverse ways in which data can be stored on the information carrier is described below in connection with a trip along the middle Rhine. Historic data on castles can be given, for instance, as a sound document; at the Lorelei, the Lorelei song can be played; for Rhine shipping, schedules can be displayed and tickets can be reserved via the uplink channel. On the downlink channel, it is possible to find out up-to-date information on rates and occupancy of hotels, or even to get information on the offers of eating and drinking establishments. Especially for passengers, short films can be shown on places being passed, in order to be able to decide where to stop. Whilst the navigational system constantly ascertains the current position of the vehicle, if automatic operation is activated, the user is given data on the objects he can just then see in his surroundings.

What is claimed is:

1. An information carrier for a navigation device in a motor vehicle, comprising:
    a first storage area storing a digital road map; and
    a second storage area storing data on special objects, positions in the digital road map being assigned to the special objects, the data on the special objects including data configured for optical output, the data on the special objects including text and at least one of: an image, an image sequence, a film, sound data and music data, wherein addresses are assigned to the special objects via which at least one of further and up-dated data are retrievable by radio communication.

2. The information carrier according to claim 1, wherein the first storage area and the second storage area are configured on a CD-ROM.

3. The information carrier according to claim 1, wherein the data on the special objects is output according to criteria predefined by a user.

4. The information carrier according to claim 3, wherein the data on the special objects is output automatically in dependence on a current position of the motor vehicle.

5. The information carrier according to claim 1, further comprising:
    a third storage area storing sets of information for operation of the motor vehicle, the sets of information being in the form of at least one of an image, an image sequence, a film, a sound document, and a music document.

6. The information carrier according to claim 1 wherein the data further includes information for operating the motor vehicle in the presence of a vehicle defect.

7. The information carrier according to claim 1, wherein the addresses are Internet addresses.

8. A navigational device for navigating a vehicle in a road network supplied to the navigational device via an information carrier in a form of a digital road map, comprising:

at least one of an optical device and an acoustical device, driving directions and sets of data concerning special objects being output via the at least one of the optical device and the acoustical device, the sets of data concerning the special objects being in a form of at least one of an image, an image sequence, a film, a sound document and a music document; and a radio communication device retrieving the sets of data concerning the special objects, wherein at least one uplink channel is available to the navigational device.

9. The navigational device according to claim 8, wherein the special objects lie along a travel route identified by the navigational device.

10. The navigational device according to claim 8, wherein a reservation at one of the special objects is made via the at least one uplink channel.

11. The navigational device according to claim 10, wherein a confirmation to the reservation takes place via a downlink channel.

12. The navigational device according to claim 11, wherein at least one of the channels is realized as a video telephone connection.

13. The navigational device according to claim 8, further comprising:

an information carrier, further sets of data concerning the special objects being stored on the information carrier, the further sets of data being in a form of at least one of an image, an image sequence, a film, a sound document and a music document, the further sets of data being output via the at least one of the optical device and the acoustical device according to predefinable criteria.

14. The navigational device according to claim 8, further comprising:

a first playback device configured to play back the information carrier; and a CD disc driver for playing back a further information carrier.

15. The navigational device according to claim 8, wherein the at least one of the optical device and the acoustical device includes a radio of the vehicle.

16. A method of providing navigational information to a user in a vehicle, comprising:

receiving data concerning special objects to a navigational device, the data being at least one of an image sequence and a film; and at least one of optically displaying and acoustically playing the data concerning the special objects.

17. The method according to claim 16, wherein the receiving data step includes receiving the data concerning the special objects via radio communication.

18. The method according to claim 16, wherein the receiving data steps includes receiving the data concerning the special objects via an information carrier.

19. The method according to claim 16, further comprising:

assigning positions on a digital map to the special objects.

20. The method according to claim 16, wherein the step of at least one of optically displaying and acoustically playing the data concerning the special objects includings at least one of optically displaying and acoustically playing the data concerning the special objects according to predefinable criteria.

21. The method according to claim 20, wherein the predefinable criterial includes a location of the vehicle relative to the special objects.

22. The method according to claim 20, wherein the predefineable criteria includes a user-defined maximum distance or generic term.

23. An information carrier for a navigation device in a motor vehicle, comprising:

a first storage area storing a digital road map; and a second storage area storing data on special objects, positions in the digital road map being defined to the special objects, the data on the special objects including data configured for optical output, the special objects including at least one of a hotel, restaurant, theater, museum, church, monument, castle, park and automotive garage, the data on the special objects including text and at least one of an image, an image sequence, a film, sound data and music data.

24. The information carrier according to claim 23 wherein addresses are assigned to the special objects via which at least one of further and up-dated data are retrievable by radio communication.

25. An information carrier for a navigation device in a motor vehicle, comprising:

a first storage area storing a digital road map; and a second storage area storing data on special objects, positions in the digital road map being assigned to the special objects, the data on the special objects including data configured for optical output, the data on the special objects including text and at least one of an image sequence, a film and music data.

26. The information carrier according to claim 25 wherein addresses are assigned to the special objects via which at least one of further and up-dated data are retrievable by radio communication.

* * * * *

UNITED STATES PATENT AND TRADEMARK OFFICE
CERTIFICATE OF CORRECTION

PATENT NO. : 6,678,609 B1
DATED : January 13, 2004
INVENTOR(S) : Duckeck et al.

It is certified that error appears in the above-identified patent and that said Letters Patent is hereby corrected as shown below:

Column 6,
Line 7, change "data step includes" to -- data steps include --
Line 16, chane "objects includings" to -- objects including --
Line 21, change "criterial includes" to -- criteria include --
Line 24, change criteria includes" to -- criteria include --

Signed and Sealed this

Twenty-seventh Day of July, 2004

JON W. DUDAS
*Acting Director of the United States Patent and Trademark Office*